US006957224B1

(12) United States Patent
Megiddo et al.

(10) Patent No.: US 6,957,224 B1
(45) Date of Patent: Oct. 18, 2005

(54) EFFICIENT RETRIEVAL OF UNIFORM RESOURCE LOCATORS

(75) Inventors: Nimrod Megiddo, Palo Alto, CA (US); Kevin S. McCurley, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/659,261

(22) Filed: Sep. 11, 2000

(51) Int. Cl.[7] .............................................. G06F 17/30
(52) U.S. Cl. ...................... 707/102; 707/10; 707/101; 707/103; 707/104.1
(58) Field of Search ........................... 707/3, 102, 104, 707/200, 203, 205, 4, 10, 101, 103; 709/203, 709/217, 218, 205, 220, 229; 704/270; 705/26; 235/462.01; 713/201

(56) References Cited

U.S. PATENT DOCUMENTS

| | | | |
|---|---|---|---|
| 5,712,979 A * | 1/1998 | Graber et al. ............... | 709/224 |
| 5,740,430 A | 4/1998 | Rosenberg et al. ......... | 707/200 |
| 5,751,956 A | 5/1998 | Kirsch ........................ | 709/203 |
| 5,812,769 A | 9/1998 | Graber et al. ............... | 709/228 |
| 5,812,776 A | 9/1998 | Gifford ....................... | 709/217 |
| 5,835,718 A | 11/1998 | Blewett ...................... | 709/218 |
| 5,867,667 A | 2/1999 | Butman et al. ............. | 709/249 |
| 5,870,546 A | 2/1999 | Kirsch ........................ | 709/205 |
| 5,884,301 A | 3/1999 | Takano .......................... | 707/3 |
| 5,895,471 A | 4/1999 | King et al. .............. | 707/104.1 |
| 5,944,793 A | 8/1999 | Islam et al. ................. | 709/220 |
| 6,029,164 A | 2/2000 | Birrell et al. .................. | 707/3 |
| 6,064,979 A * | 5/2000 | Perkowski ................... | 705/26 |
| 6,065,120 A * | 5/2000 | Laursen et al. ............. | 713/201 |
| 6,094,649 A * | 7/2000 | Bowen et al. ................... | 707/3 |
| 6,266,639 B1 * | 7/2001 | Goldberg et al. ........... | 704/270 |
| 6,304,864 B1 * | 10/2001 | Liddy et al. ................. | 706/15 |
| 6,308,179 B1 * | 10/2001 | Petersen et al. ............ | 707/102 |
| 6,393,437 B1 * | 5/2002 | Zinda et al. ................. | 707/201 |
| 6,466,940 B1 * | 10/2002 | Mills .......................... | 707/102 |
| 6,505,776 B1 * | 1/2003 | Wilz et al. ............. | 235/462.01 |
| 6,542,933 B1 * | 4/2003 | Durst et al. ................. | 709/229 |
| 6,564,254 B1 * | 5/2003 | Shoji et al. ................. | 709/217 |

(Continued)

OTHER PUBLICATIONS

Li et al., "WebDB: A Web query system and its modeling, language, and Implementation", IEEE, 1998, pp. 216-227.*

*Primary Examiner*—Thuy N. Pardo
(74) *Attorney, Agent, or Firm*—Charles W. Peterson, Jr.; Marc D. McSwain

(57) ABSTRACT

A system, method and computer program product for providing links to remotely located information in a network of remotely connected computers. The system may or may not include a server providing an interface between shorthand codes and corresponding original files. If the server is included, a uniform resource locator (URL) is registered with a server. A shorthand link is associate with the registered URL. The associated shorthand link and URL are logged in a registry database. When a request is received for a shorthand link, the registry database is searched for an associated URL. If the shorthand link is found to be associated with an URL, the URL is fetched, otherwise an error message is returned. If the server is not included, all URLs located at a root page may be listed and associated with shorthand keys or links. Associated files and keys are indexed in an index file. The shorthand codes or keys are combined with the root page to form shorthand URLs. Requests are made for the shorthand URLs and the index file is searched for the requested shorthand URL. If the requested shorthand URL is encountered, the corresponding file is returned; otherwise, an error message is returned.

17 Claims, 3 Drawing Sheets

U.S. PATENT DOCUMENTS

| | | | |
|---|---|---|---|
| 6,578,078 B1 * | 6/2003 | Smith et al. | 709/224 |
| 6,643,641 B1 * | 11/2003 | Snyder | 707/4 |
| 6,668,276 B1 * | 12/2003 | Ohkado et al. | 709/217 |
| 2001/0044800 A1 * | 11/2001 | Han | 707/104.1 |
| 2001/0047395 A1 * | 11/2001 | Szutu | 709/217 |
| 2002/0007393 A1 * | 1/2002 | Hamel | 709/203 |
| 2002/0052928 A1 * | 5/2002 | Stern et al. | 709/218 |
| 2002/0077930 A1 * | 6/2002 | Trubey et al. | 705/26 |

* cited by examiner

EFFICIENT RETRIEVAL OF UNIFORM RESOURCE LOCATORS

BACKGROUND OF THE INVENTION

1. Field of the Invention

The present invention generally relates to interconnected computers and more particularly, the present invention relates to formatted data distributed on interconnected computers.

2. Background Description

Generally what is known as the Internet or World Wide Web (WWW) is a large scale network of globally connected computers. The Internet places an almost limitless amount of information at the fingertips of each connected computer user. The information is located at various globally connected computers, each at what is typically referred to as a "Web Site." Each web site may include multiple accessible web pages linked to each other. Each web page is a data file encoded in HyperText Markup Language (HTML) or a similar browser friendly code. A web page may include one or more Hypertext links or Hyperlinks, each to a Universal or Uniform Resource Locator (URL) that points to a file at an Internet location. The file may be any type of file including but not limited to another HTML document or web page, a word processing document, compressed or uncompressed data or simple text.

Typical URLs specify the location of individual resources at a particular location or domain, but not necessarily in a compact way. An important feature of most domain names are intuitiveness indicating its origin and making memorization easier. Organizations may prefer domain names that reflect or are identical with the organization name, e.g., www.judicialwatch.org. A typical URL is a domain name followed by a path and, then with individual file names attached. So, a URL may become long and unwieldy and under some circumstances may be unusable without some form of compression.

These large unwieldy URLs may become troublesome, especially, when large numbers are being handled with limited resources. So, for example, using a wireless web appliance (such as a cellular phone (cell phone) or pager with a built in browser or a personal digital assistant (PDA) connected to the web with a wireless connection) memory, keystrokes and bandwidth may all be at a premium. Clearly, the more larger URLs that are being stored on the wireless web appliance, entered into the appliance's browser and being transmitted between the appliance and its ground station, the more of a problem these large URLs become. This problem is further exacerbated when a URL request from a wireless web appliance results in a display that includes several of these large URLs. Still other circumstances where these large unwieldy URLs may create a nuisance include when the URLs are embedded within some digital contents or in printed bar codes.

U.S. Pat. No. 5,835,718 to Blewett entitled "URL Rewriting Pseudo Proxy Server" teaches a real-time URL remapping method directed to the commercial needs of Internet businesses. Since internet advertisers and services charge for information access, customer interactions HTML based content must be recorded. Blewett teaches a method wherein customers interact with such content through a proxy machine that records the interactions. Thus, the customers' web based requests are directed to a proxy machine that maps that request to a URL where the desired content is located. However, Blewett does not allow any user to register codes for arbitrary URLs and the method of Blewett hides the true URL to further its goal of tracking requesters.

U.S. Pat. No. 5,895,471 to King et al., entitled "Providing a Directory of Frequently Used Hyperlinks on a Remote Server" teaches a directory server that stores directories associated with remote devices. As described in King et al., remote devices include storage, a display and a button and can receive and display hypermedia information based on an identifier, i.e., any state of the art internet browser. The devices also can send identifiers to the directory server, which may add them to the associated directory. A device also may request that the server retrieve previously stored information. Thus, the directory server stores bookmarks for the remote device owner and, merely returns the full URL to any device seeking access to the particular file or document located at the URL.

Further, America On Line (AOL) includes a feature in its service referred to as "keywords." Typically, AOL sells keywords to vendors and then, males the keywords available for information look up. For example, AOL might sell "travel" as a keyword to a travel agency. So that when an AOL member enters the keyword "travel" in the AOL service, the member is directed to information at the travel agency's site. Normally keywords are short mnemonics that are easy to remember, something much shorter than a URL. This makes keywords easy to distribute, the vendor tells customers the keyword for later retrieval of information. Further, keywords are easily conveyed to an audience in radio or TV broadcasts or in print advertising. However, a human must manually enter keywords.

Accordingly, there is a need for efficient ways of identifying and selecting web based information that do not overload browser resources and seamlessly providing the selected web based information.

SUMMARY OF THE INVENTION

It is therefore a purpose of the present invention to reduce the size of web browser cached data;

It is another purpose of the invention to reduce web browser load;

It is yet another purpose of the invention to reduce internet traffic.

The present invention is a system, method and computer program product for providing links to remotely located information in a network of remotely connected computers. A uniform resource locator (URL) is registered with a server. A shorthand link is associated with the registered URL. The associated shorthand link and URL are logged in a registry database. When a request is received for a shorthand link, the registry database is searched for an associated URL. If the shorthand link is found to be associated with an URL, the URL is fetched, otherwise an error message is returned.

Alternately, all URLs located at a root page may be listed and associated with shorthand keys or links. Associated files and keys are indexed in an index file. The shorthand codes or keys are combined with the root page to form shorthand URLs. Requests are made for the shorthand URLs and the index file is searched for the requested shorthand URL. If the requested shorthand URL is encountered, the corresponding file is returned; otherwise, an error message is returned.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF PREFERRED EMBODIMENTS OF THE INVENTION

Figure 1:
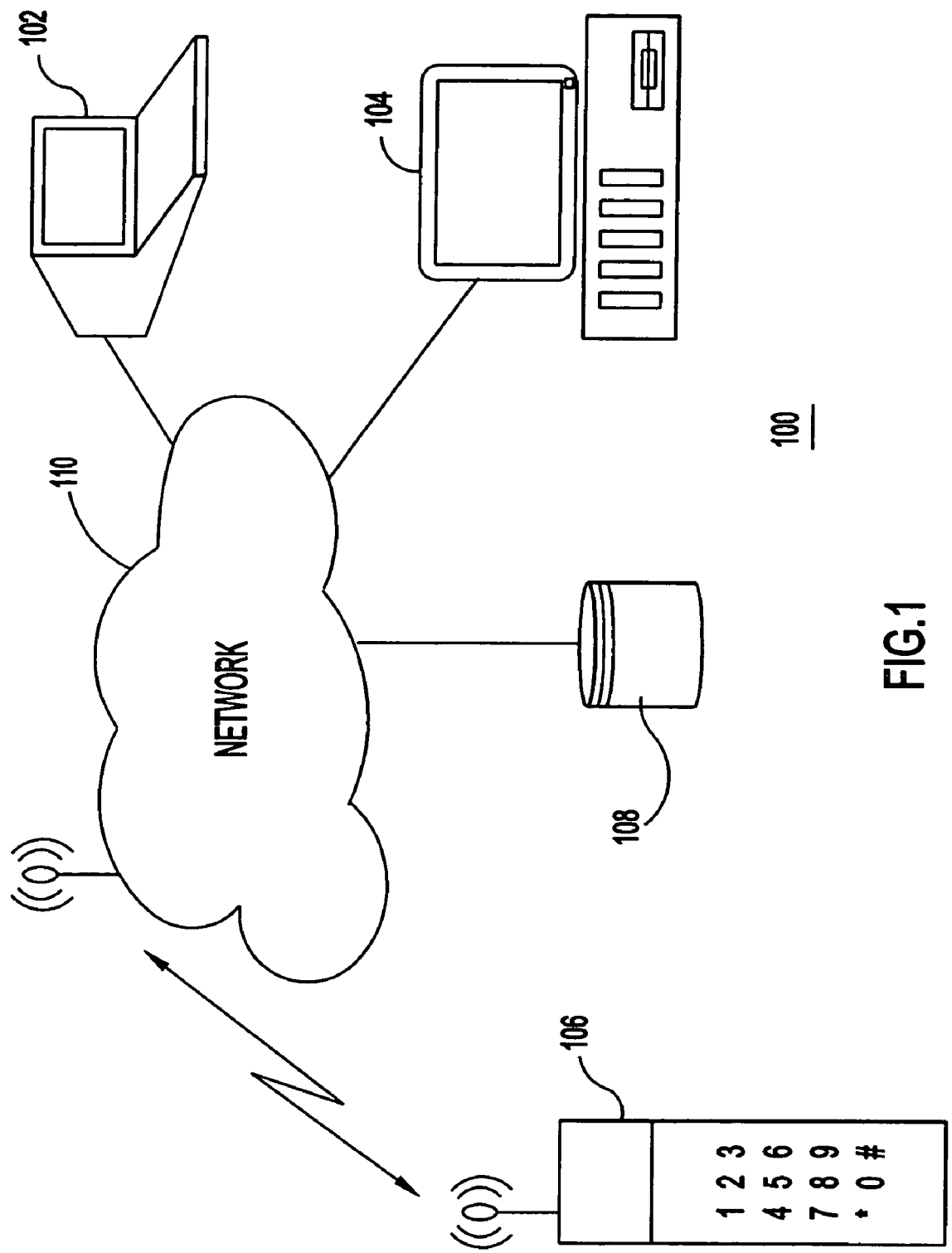
FIG. 1 is an example of a distributed system for the preferred embodiments of the invention wherein multiply connected users or clients communicate with a database over a network of remotely connected computers.
Figure 2:
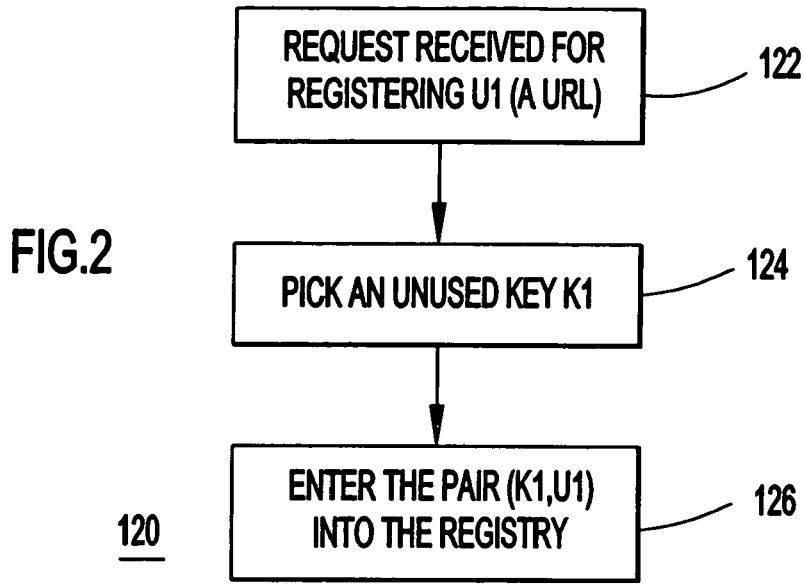
FIG. 2 shows a flow diagram of the steps in registering URL with the server.
Figure 3:
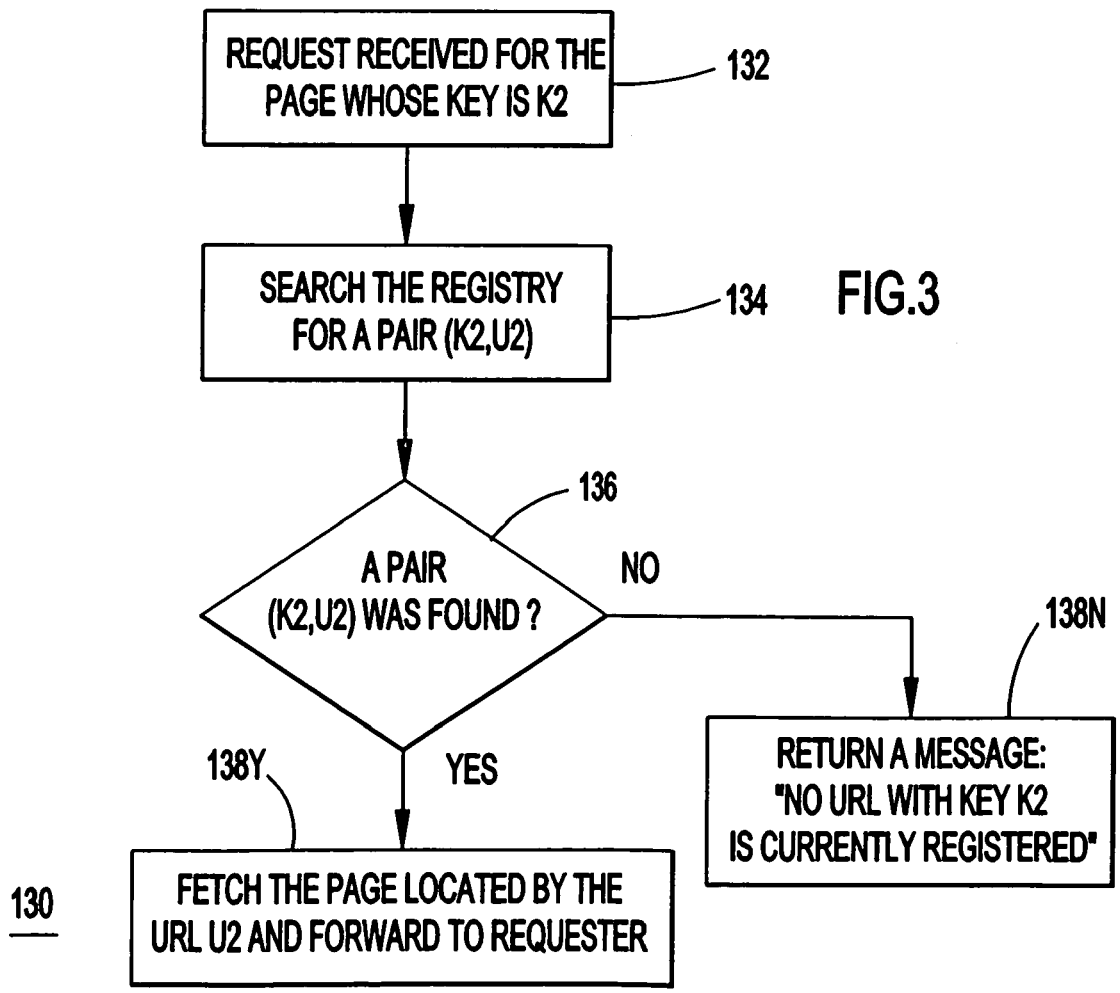
FIG. 3 shows a flow diagram of the steps in retrieving previously registered URLs from the registry database on the server.

Referring now to the drawings, and more particularly, FIG. 1 is an example of a distributed system 100 for the preferred embodiments of the invention wherein multiply connected users or clients 102, 104, 106 communicate with a database 108 over a network 110 of remotely connected computers, such what is known as the Internet or the World Wide Web (www). FIGS. 2 and 3 represent first embodiment of the present invention wherein an entity, e.g., an on-line shopping service, registers codes with a code server that maintains a shorthand database 108. The registered codes, which correspond Uniform Resource Locators (URLs) for the entity, are mapped in one-to-one fashion to shorthand codes. When a web browser at one of the remotely connected computers 102, 104, 106 requests access to one of the shorthand codes, the server redirects the web browser to the true URL. As can be seen from the example of FIG. 1, the client computers may be, for example, a network computer or thin client 102, a personal computer 104 or, a web enabled cell phone 106 or personal digital assistant (not shown).

Turning to FIGS. 2 and 3 in this first embodiment, the server functions as a compact code server, maintaining a database 108 of all the URL's that have been associated with a compact code. For example, the original URL, http://www.sontimes.com/output/novak/novak201.html (or something even more cumbersome) may be associated with Qa2yZ. Instead of requesting the original URL, a more compact http://codes.server.com?key=Qa2yZ may be substituted. The code server, upon receiving a request for the more compact shorthand code would initiate an HTTP redirect to the site corresponding to the original URL. Optionally, the server may charge a nominal fee for each redirect, basing the royalty stream for the service provided upon the number of referrals.

FIG. 2 shows a flow diagram 120 of the steps in registering URLs with the server according to the preferred embodiment of the present invention. First, in step 122, the server receives a request from a site owner or, from any web user, to register one or more URLs. Then for each URL, in step 124, the server selects an unused key or shorthand code. Preferably, keys are selected to be as short as is practicable, without being exposed to accidental discovery or to correct, automatically, erroneous entries. With this goal, keys are selected to be sufficiently different from each other such that a number of single character changes are necessary to convert one key to another one. In step 126, the unused key is entered into the registry database 108 as corresponding to one of the URLs. Also, these short keys may be embedded as hyperlinks in web pages, included in e-mail, and stored in devices with limited storage such as a PDA.

FIG. 3 shows a flow diagram 130 of the steps in retrieving previously registered URLs from the registry database 108 on the server. First, in step 132, the server receives a shorthand coded request or a key for a corresponding page. Then, in step 134, the server searches the registry database 108 for a URL corresponding to the provided key. In step 136, the server determines whether a corresponding URL is found in the database 108. If the key is not found, e.g, due to an error or from someone entering random sequences of characters, in step 118N, the server returns an error message indicating that the corresponding URL has not been found. Otherwise, in step 138Y, the page corresponding to the key is accessed and forwarded to the requestor.

Figure 4:
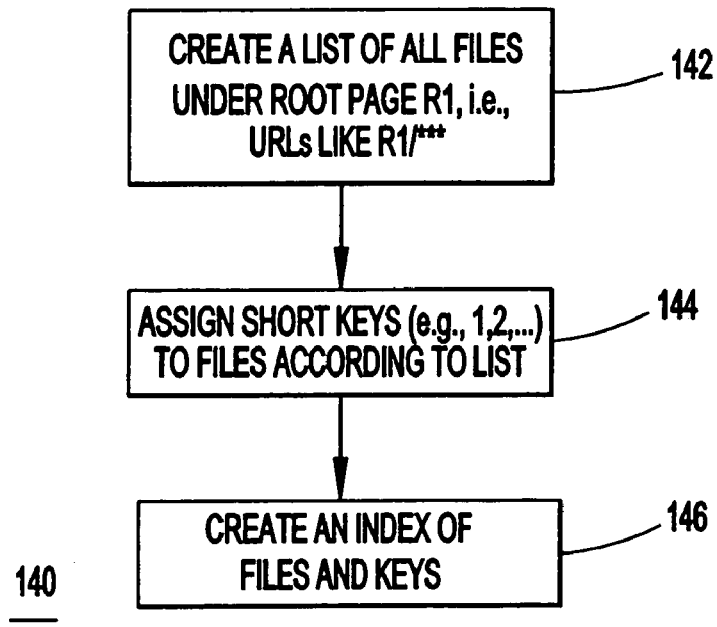
FIG. 4 is an example of a flow diagram of how shorthand codes are associated in the second preferred embodiment.
Figure 5:
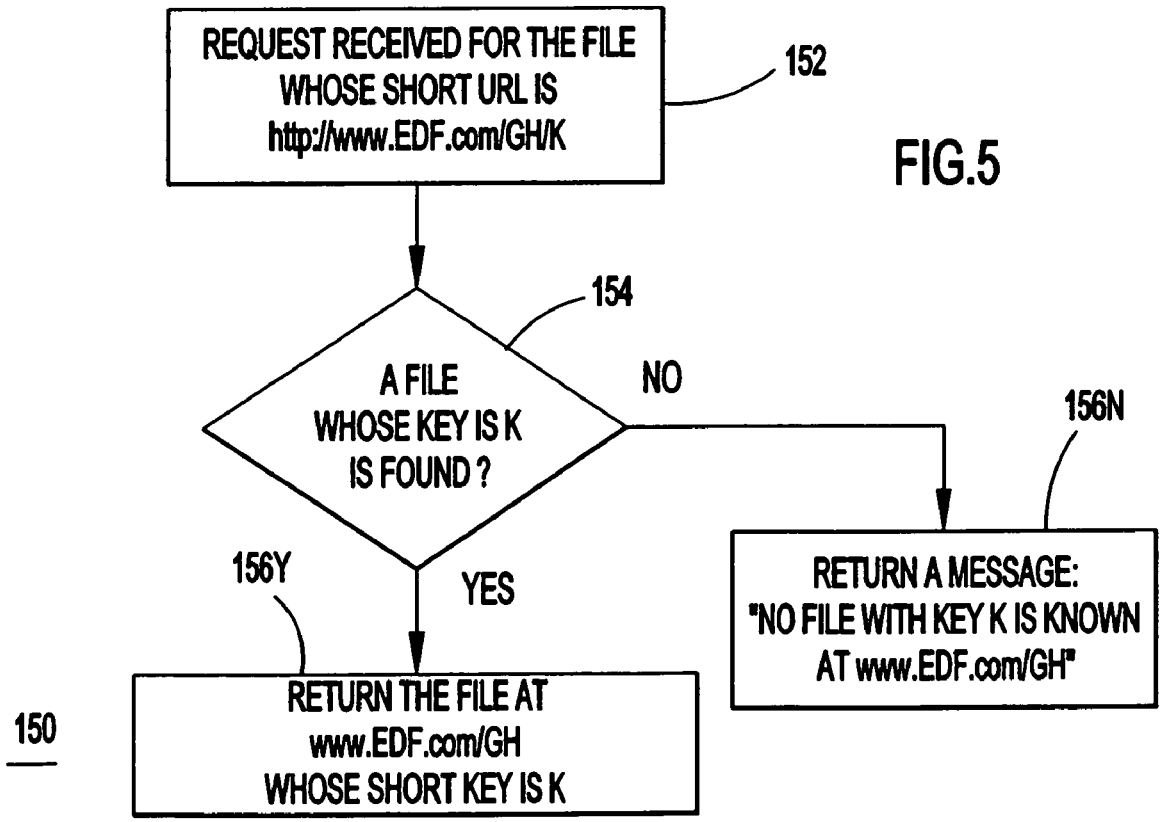
FIG. 5 shows an example of a flow diagram showing the steps in retrieving a file for a particular URL.

FIGS. 4 and 5 represent a second preferred embodiment of the present invention wherein files at a selected website are reorganized by associating each file with a shorthand code corresponding to its path and location, in this second preferred embodiment, each domain is encoded individually. Instead of a code server as in the first preferred embodiment, codes are associated or assigned individually to the URLs at the participating domain. Code assignment may be at the domain owner's request or, alternately, domain owners may run code assignment software themselves, with database 108 being located at the domain server. A client or web site visitor may suggest or request that the domain owner install the shorthand coding on the domain server to enable or facilitate server access. So, for example, for the domain sontimes.com, the file output/novak/novak20.html may be associated, more compactly, with A2gd. The URL http://www.sontimes.com/A2gd would be redirected to the appropriate file. Thus, problems associated with long domain names are dissipated transparently to site visitors because, normally, URLs replace IP addresses anyway, e.g., www.sontimes.com may be equivalent to 72.3.109.110.

So, in FIG. 4, which is an example of a flow diagram 140 of how shorthand codes are associated in the second preferred embodiment, in the first step 142, a list is created of all files at the root page. Then, in step 144, shorthand keys are assigned to each identified file. In step 146, an index of files with corresponding keys is created.

FIG. 5 shows an example of a flow diagram 150 showing the steps in retrieving a file associated with a particular shorthand URL. First, in step 152, a browser requests access to a shorthand URL. Then, in step 154 the domain server searches the local shorthand database 108 to identify a local file to which the requested shorthand URL corresponds. If no corresponding file is identified, then, in step 156N, an error message is returned indicating that there is no corresponding file. Otherwise, in step 156Y, the file identified as corresponding to the requested key is returned.

It should be noted that in the above examples, the part of the shorthand URLs represented by http://codes.server.com part is the same for all shorthand URLSs.

Accordingly, the amount of information that must be stored or transmitted to refer to the original URL is only the shorthand (Qa2yZ) part. Moreover, the codes.server.com example site optionally may reply with a previously cached page directly or, issue an HTTP redirect as described above. Which option is chosen may depend upon whichever option is more appropriate to the bandwidth or latency requirements of the underlying network at the time of the request.

Further, in contrast to AOL keywords, the present invention uses much shorter free form alpha numeric strings that are designed for transmission by machines and not constrained to an existing English word. Thus, by associating a much larger URL with an arbitrary but much more compact shorthand URL, the present invention realizes optimum compression of storage for keys in the redirection server. In addition, the present invention facilitates servicing competing vendors, since there is no need to favor one vendor over another by assigning one a better (easier to remember) keyword. Moreover, the present invention may be applied to any referral service provider.

While the invention has been described in terms of preferred embodiments, those skilled in the art will recognize that the invention can be practiced with modification within the spirit and scope of the appended claims.

What is claimed is:

1. A method of providing links to remotely located information in a network of remotely connected computers, said method comprising:
   a) associating a shorthand link to each of a plurality of uniform resource locators (URLs) by
      i) requesting registration of a URL;
      ii) selecting an unused key; and
      iii) pairing said selected key with said URL as a shorthand link;
   b) logging associated shorthand links in a registry database;
   c) searching said registry database for a shorthand link associated with an URL responsive to selection of said shorthand link; and
   d) for each found said shorthand link, fetching said associated URL.

2. A method as in claim 1, wherein each key-URL pair is entered in the registry database.

3. A method as in claim 2, wherein said fetched associated URL is presented to a requester, said requestor having selected said shorthand link.

4. A method as in claim 2, wherein said fetched associated URL is presented to a requester, said requestor having provided the paired key of the key-URL pair.

5. A method as in claim 4, wherein an error message is returned whenever a requestor provides a key not paired with a URL.

6. A method as in claim 4, wherein when a provided key not associated with a URL is identified as corresponding to a key in a key-URL pair, presenting the identified URL to said requester.

7. A method of providing links to remotely located information in a network of remotely connected computers, said method comprising:
   a) associating a shorthand link to each of a plurality of files at a remotely connected location by
      i) creating a list of files at said remotely connected location; and
      ii) selecting and associating an unused key with each listed file;
   b) indexing shorthand links and associated files;
   c) searching said index for a shorthand link associated with one of said plurality of files responsive to selection of said shorthand link; and
   d) for each shorthand link found, fetching the associated indexed file.

8. A method as in claim 7, wherein said fetched file is presented to a requester, said requester having selected said shorthand link.

9. A method as in claim 7, wherein said fetched file is presented to a requester, said requestor having provided the key associated with the fetched file.

10. A method as in claim 9, wherein an error message is returned whenever a requestor provides a key not associated with a file.

11. A method as in claim 9, wherein when a key not associated with a file is identified as corresponding to a key associated with a file, providing the file associated with the identified key to said requestor.

12. A computer program product for providing links to remotely located information in a network of remotely connected computers, said computer program product comprising a computer usable medium having computer readable program code thereon, said computer readable program code comprising:
   computer readable program code means for associating a shorthand link to each of a plurality of uniform resource locators (URLs) including
      computer readable program code means for requesting registration of a URL;
      computer readable program code means for selecting an unused key; and
      computer readable program code means for pairing said selected key with said URL as a shorthand link;
   computer readable program code means for registering associated shorthand links in a database;
   computer readable program code means for searching said database for a shorthand link associated an URL responsive to selection of said shorthand link; and
   computer readable program code means for fetching any found said associated URL.

13. A computer program product as in claim 12 further comprising:
   computer readable program code means for maintaining said database of registered key-URL pairs.

14. A computer program product as in claim 13 further comprising:
   computer readable program code means for presenting an URL to a requestor responsive to said requestor selecting an associated shorthand link.

15. A computer program product as in claim 13 further comprising:
   computer readable program code means for presenting an URL to a requestor responsive to said requester providing a corresponding paired key.

16. A computer program product as in claim 15 further comprising:
   computer readable program code means for determining whether a provided key is a paired key; and
   computer readable program code means for indicating an error whenever said provided key is determined not to be a paired key.

17. A computer program product as in claim 15 further comprising:
   computer readable program code means for determining whether a provided key is a paired key;
   computer readable program code means for determining whether said provided key corresponds to a paired key whenever said provided key is determined not to be a paired key; and
   computer readable program code means for presenting an URL paired with said corresponding identified key.

* * * * *